UNITED STATES PATENT OFFICE.

ALBRECHT SCHMIDT AND ADOLF STEINDORFF, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

PROCESS OF MANUFACTURING FINELY-DIVIDED COLLOID-LIKE INDIGO.

1,057,887. Specification of Letters Patent. Patented Apr. 1, 1913.

No Drawing. Application filed July 9, 1912. Serial No. 708,480.

*To all whom it may concern:*

Be it known that we, ALBRECHT SCHMIDT, Ph. D., chemist, and ADOLF STEINDORFF, Ph. D., chemist, citizens of the Empire of Germany, residing at Höchst-on-the-Main, Germany, have invented certain new and useful Improvements in the Process of Manufacturing Finely-Divided Colloid-Like Indigo, of which the following is a specification.

In U. S. Patent No. 671,344 is described a process of preparing indigo-vats by means of a certain indigo, formed with water by dissociation of the indigo-sulfate separating from the sulfuric acid in the form of blackish-brown needles. Now we have found that another indigo-sulfate can be produced in sulfuric acid and thus an indigo of extremely finely-divided colloid-like consistence can be obtained, by starting, not with the crystalline greenish-black-brown sulfate mentioned in said patent, but with the other thickish indigo-sulfate first forming in the sulfuric acid, which is of an amorphous character or of another constitution, possibly monosulfate or semi-sulfate. Thus, if indigo is rapidly introduced, while stirring, into sulfuric acid of 60° Bé., which may advantageously be cooled and of which so much is taken that the mass can still be stirred, for instance 7 times the weight, there is obtained, as we have found, first an extremely thickish magma, from which, by the addition of ice, the indigo can be separated in said colloid-like form. When a test-quantity of this magma is spread in a thin layer on a microscope slide and under a cover-glass, it shows a cyaneous color and presents an almost homogeneous blue aspect; and when examined in the microscope, only very fine blue structures of an amorphous character are visible. It might seem that those structures are formed merely by a mixture of unchanged indigo with sulfuric acid, like a mixture of indigo with glycerin, because the latter when spread between object-glass and cover-glass also shows a similar transparent-blue layer. The fact that, in spite of the short time, low temperature and high consistence of the mass, the sulfuric acid has acted upon the indigo, is proved by the rise of the temperature by about 5° C. and by the following considerations: If the mass is rapidly put on ice, or vice versa, if ice is introduced into the magma, an extremely finely-subdivided indigo forms, which is entirely different from the primary dyestuff, as is particularly apparent after having thoroughly washed off the sulfuric acid and triturated the press cake with some caustic soda-lye or other suspending agent. However, by the method described in said patent, consisting in allowing the greenish-blackish-brown crystalline indigo-bisulfate (compare example) to form, an indigo is obtained which is not nearly so finely subdivided as is our new form of indigo, and which possesses otherwise quite different properties. Indigoes of a pronounced crystalline character are found in the market under the brands "indigo S" and "indigo S. B." The greenish-blackish-brown crystalline indigo-bisulfate described in said patent, easily forms upon gradual introduction of the indigo into sulfuric acid at a higher temperature (30° C.) and thorough stirring. A crystalline sulfate is also obtained by stirring for a considerable time, particularly at an elevated temperature, the before-mentioned very thick magma consisting of the new indigo-sulfate. As compared with the indigo-sulfate described in said patent, the indigo-sulfate obtained by the present process shows, when put between the object-glass and the cover-glass, an entirely different appearance, the sulfate described in said patent, showing coarse, greenish blackish crystalline aggregates or coarse isolated crystals. Furthermore, the indigo sulfate separating from the mass is more sandy and the mass itself considerably more thinly liquid. Moreover, the indigoes obtained from the two sulfates in question by decomposition with water are of an entirely different character. The indigo obtained according to said patent, and for instance also the commercial indigo-brands "S" and "S. B.", when examined in the microscope, appear in the form of distinct crystals. When considerably magnified, their particles appear very dense and dark in the field of view. When made up into a strongly-diluted paste, and even when triturated with caustic-soda lye, they do not pass through a filter. They are not, or only slightly, capable of forming pigments with a substratum, for instance baryta. They deposit very rapidly, as can be ascertained by centrifugation of a strongly diluted paste in a capillary by means of an apparatus such as used for centrifugating bacteria. They show also other differences from the indigo obtainable according to the present application. The latter, when strongly magnified, is visible as light-bluish, minute particles without a proper discernible structure, so that they appear to be amorphous structures or aggregates. When strongly diluted with water, it yields a difficultly depositing blue liquid, as is also proved by the bacteriological centrifuge. When filtered, the liquid passes for the most part through the filter. Its paste, when spread, shows a pigment-like character, and when dry it yields, with or without the addition of other substances, products which very much resemble natural indigo. This indigo is very easily reducible in the cold glucose-vat, and in the cold fermentation vat (both comprised under the term "slightly alkaline reducing agents"), and presents also in other respects some differences. The indigo obtained by the present process is identical with that described in applications Ser. No. 577,200 filed 19th August, 1910, and Ser. No. 576,703 filed 11th August, 1910.

Example: 100 kg. of indigo MLB powder are introduced into 700 kg. of sulfuric acid of 60° Bé., cooled down to 15° or below (for instance 0° C., 5° C., etc.), or even below 0° C., the introduction being advantageously effected not too slowly, according to the respective temperature. After the mass has been stirred for a short time, a very stiff magma forms with a rise of temperature of about 5° C. This magma, when spread and pressed between two glasses, shows a cyaneous color and the other beforementioned characteristic properties. The introduction of the indigo and the rapid working up of the magma can be facilitated by mechanical means, for instance a screw-device, etc. By using such a mechanical apparatus the quantity of the sulfuric acid can be greatly diminished, and by using a small quantity of sulfuric acid and a comparatively large quantity of indigo, a mass is obtained capable of being kneaded and spread into a thin layer, continuously if required, whereupon the decomposition of the sulfate with water is effected. The operations may also be reversed in order to obtain a thick magma and the so-called "blue" sulfate as free as possible from greenish-black sulfate; in this case it is advantageous to cool the sulfuric acid and mix it with the indigo-powder. In order to obtain the finely-divided colloid-like indigo, the magma is decomposed by the direct addition of 700 kg. of ice. This must be done while the magma still looks blue when seen through a very thin layer, does not have a crystalline appearance under the microscope and possesses the beforementioned properties. In this condition it remains for a longer time when a low temperature is used and the stirring is discontinued, because when the characteristic thick magma is once formed, it turns, even at a higher temperature, more slowly into the thin-liquid, greenish-blackish-brown coarser and more sandy sulfate, i. e. into crystalline sulfate. The indigo thus separated is filtered and washed, and it is advantageous to then triturate with some caustic soda-lye or other dividing agent. The formation of the sulfate yielding the finely-subdivided colloid-like indigo, and also its decomposition, is furthermore facilitated by the addition of organic or inorganic substances (which we comprise under the term "suitable additional substances") for instance by the addition of the substances mentioned in patent-applications Ser. No. 576703 filed 11th April 1910; Ser. No. 577200 filed 19th August 1910; Ser. Nos. 627758 and 627759 filed 17th May 1911; and Ser. No. 645,610 filed 23rd August 1911; such as sulfonic acids or their salts, or by the addition of inorganic thickening or filling materials, such as china-clay, sodium sulfate, silicic acid-hydrate or the like, to the sulfuric acid or to the aqueous decomposition-liquid.

Having now described our invention, what we claim, is:

1. The process of preparing finely-subdivided indigo from indigo-sulfate, which consists in causing sulfuric acid to act on indigo only so long and only at so low a temperature that a magma containing colloid-like indigo-sulfate forms, which, when seen through a thin layer, looks blue and which does not show any discernible crystalline character, and then dissociating the colloid-like sulfate contained therein by the addition of water.

2. The process of preparing finely divided indigo from indigo sulfate, which consists in causing sulfuric acid, to which suitable substances are added, to act on indigo only so long and only at so low a temperature that a magma containing colloid-like indigo-sulfate forms, which, when seen through a thin layer, looks blue and which does not show any discernible crystalline character, and then dissociating the colloid-like sulfate contained therein by the addition of water.

In testimony whereof, we affix our signatures in presence of two witnesses.

ALBRECHT SCHMIDT.
ADOLF STEINDORFF.

Witnesses:
  JEAN GRUND,
  CARL GRUND.